(12) United States Patent
Kumar et al.

(10) Patent No.: US 8,621,122 B2
(45) Date of Patent: Dec. 31, 2013

(54) METHOD AND APPARATUS FOR TRANSFERRING DATA

(75) Inventors: Vaibhav Kumar, San Diego, CA (US);
Mark A. Landguth, La Jolla, CA (US);
Mohit K. Prasad, San Diego, CA (US);
Erez Tsidon, Nir-Ezioh (IL); Shailesh Maheshwari, San Diego, CA (US);
Rashmi Char, San Diego, CA (US);
Robert C. Coleman, San Diego, CA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 432 days.

(21) Appl. No.: 13/081,713

(22) Filed: Apr. 7, 2011

(65) Prior Publication Data

US 2012/0260008 A1  Oct. 11, 2012

(51) Int. Cl.
*G06F 13/00* (2006.01)
*G06F 3/00* (2006.01)

(52) U.S. Cl.
USPC ............ 710/51; 710/2; 710/5; 710/8; 710/15; 710/32

(58) Field of Classification Search
None
See application file for complete search history.

(56) References Cited

U.S. PATENT DOCUMENTS

2006/0075174 A1* 4/2006 Vuong .......................... 710/302

* cited by examiner

*Primary Examiner* — Scott Sun
(74) *Attorney, Agent, or Firm* — Neugeboren O'Dowd PC

(57) ABSTRACT

One embodiment of the invention comprises a non-transitory, tangible computer readable storage medium encoded with processor readable instructions to perform a method of transferring SDIO data. One method comprises buffering multiple IP packets to transfer from one of a SDCC host and a SDIO client to the other of the SDCC host and the SDIO client. A multiplexing header is attached to each of the multiple IP packets and one of at least one SDIO read command and at least one SDIO write command issued. The multiple IP packets are then transferred in a single SDIO transfer between the one of a SDCC host and a SDIO client to the other of the SDCC host and the SDIO client.

21 Claims, 12 Drawing Sheets

"PRIOR ART"

METHOD AND APPARATUS FOR TRANSFERRING DATA

FIELD OF THE INVENTION

The present invention relates to communication architecture in a computing device. In particular, but not by way of limitation, the present invention relates to optimizing mobile computing device Secure Digital Input Output (SDIO) data transfer.

BACKGROUND OF THE INVENTION

Computing devices such as, but not limited to, mobile computing devices, may comprise one processor, or CPU, for processing high level Operating System (OS) operations and end-user application operations, and a second CPU for processing modem operations. These processors are often referred to as the applications processor (AP) and the baseband processor or modem processor (MP), respectively. In such an architecture, the AP and MP often communicate through the use of a high speed interface adapted to support very high data rates. One type of high speed interface is an SDIO interface.

One SDIO interface comprises an architecture having an asymmetric communication protocol between an AP Secure Digital Card Controller (SDCC) host and an MP SDIO client, with all data transfers being initiated and controlled by the SDCC host. The use of the SDIO interface as an interconnect between the AP and the MP poses special challenges for supporting very high data rates. For example, when IP packets must be transferred between the processors, not an insignificant portion of the data transfer between the processors comprises protocol overhead such as, but not limited to, control information.

For example, a single SDIO transfer of data typically requires initiation of a CMD 53 operation from the SDCC host in order to read data to, or write data from, the SDCC host. The CMD 53 operation may specify a number of bytes (or a number of blocks, with each block comprising a preconfigured size, such as, 256 bytes) to read from, or write to, the SDIO client. Each CMD 53 command may be followed by a data transfer phase in which the data blocks/bytes are read from the SDIO client, or written to the SDIO client. Typically, a SDIO transfer may be initiated for each IP packet, with a typical maximum packet size corresponding to an Ethernet Maximum Transmission Unit (MTU) of about 1500 bytes.

Therefore, SDIO control data may be attached to each IP packet. The SDIO control data may define one or more control registers. These control registers may be read prior to initiating the data transfer. In one embodiment, the control registers may determine whether the SDIO client has pending data that should be read, or, the control register read may be a check to determine that the client has enough buffer space to initiate a write transfer from the SDCC host. Since a transfer of each IP packet may currently require an attachment of this overhead control information, if the amount of overhead for each IP packet is decreased, the space previously contained by the control information can be replaced with additional IP packet data, thereby increasing the overall IP data transfer rate.

A related issue is the amount of AP CPU overhead associated with each SDIO transfer. In an upload transfer from the SDCC host to the SDIO client, a Direct Memory Access (DMA) may be implemented by SDCC hardware in order to move the data from the system memory to the SDCC hardware. The data would then be sent over the SDIO interface bus to the SDIO client. In such an operation, a SDCC driver is typically used to program the DMA operation—relinquishing the CPU for other processing needs. The SDCC hardware then typically notifies the driver software of the completion of the DMA operation asynchronously by interrupting the CPU. Therefore, the time lost from the CPU interrupt must be more than offset by the CPU gains in using the DMA operation. Otherwise, there would be lower CPU overhead lost with using the CPU to transfer the data instead of using the DMA.

For example, when each IP packet is transferred in a single transaction, the DMA transfer is small and of the order of 1500 bytes (assuming Ethernet MTU). When this occurs, the rate at which the host CPU needs to process interrupts limits the ability to transfer data at a very high data rate. Similarly, in downlink transfers from the SDIO client to the SDCC host, an additional host CPU interrupt occurs as the SDIO client notifies the SDCC host that data is available to be transmitted through the use of an interrupt, which is necessary because of the asymmetric nature of the SDIO protocol (the host must initiate all transfers). Upon receiving the interrupt, the SDCC host would start a read operation to read the available data from the SDIO client. Decreasing the number of AP host interrupts per IP packet would increase the rate at which packets are transferred.

SUMMARY OF THE INVENTION

Illustrative embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents, and alternative constructions that fall within the spirit and scope of the invention as expressed in the claims.

The proposed ideas address the above-mentioned concerns of control overhead and CPU interrupts by reducing the number of distinct SDIO transactions required to transfer IP packets at very high data rates over the SDIO interface. For example, a single SDIO transaction may be used to transmit data comprising multiple IP packets. Therefore, the amount of SDIO protocol overhead, as well as the cost of CPU interrupts is spread out, or amortized, over multiple IP packets.

One embodiment of the present invention comprises a non-transitory, tangible computer readable storage medium, encoded with processor readable instructions to perform a method of transferring SDIO data across an SDIO interface, the method comprising, buffering multiple IP packets to transfer from one of a SDCC host and a SDIO client to the other of the SDCC host and the SDIO client. A multiplexing header is attached to each of the multiple IP packets and one of a SDIO read command and a SDIO write command is issued. The multiple IP packets are then transferred between the one of a SDCC host and a SDIO client to the other of the SDCC host and the SDIO client in a single SDIO transfer.

Another embodiment of the invention may be characterized as a mobile computing device that includes a first processor operatively coupled to a first end of a communication interface and a second processor operatively coupled to a second end of the communication interface. The communication interface is adapted to buffer multiple data packets, attach a multiplexing header to each of the multiple data packets, and transfer the multiple data packets from at least one of the first processor and the second processor to at least one of the other one of the first processor and the second processor in at least one single transfer operation.

Yet another embodiment of the invention may be characterized as a method of transferring data across an SDIO interface. One method comprises receiving multiple IP packets at at least one of a SDCC host and a SDIO client, buffering the multiple IP packets at the at least one of a SDCC host and a SDIO client, and attaching a multiplexing header to each of the multiple IP packets. The method further comprises initiating one of a read and a write operation from the SDCC host and performing a single SDIO transfer from the one of the SDCC host and SDIO client to the other of the SDCC host and the SDIO client for the multiple IP packets. Finally, the multiple IP packets are then demultiplexed at the other of the SDCC host and the SDIO client.

And another embodiment of the invention may be characterized as a mobile computing apparatus. One mobile computing apparatus includes means for a SDCC host to control at least one of a SDIO client IP packet aggregation and a SDCC host IP packet aggregation through configuring a SDCC host feature comprising an active state and an inactive state wherein the active state comprises (i) at least one of a configurable SDIO client IP packet aggregation threshold and a configurable SDCC host IP packet aggregation threshold, and (ii) initiating an aggregation timer, and the inactive state comprises an SDIO client IP packet aggregation limit of about 1 byte. The mobile computing apparatus further comprises means for setting the SDCC host feature to the inactive state, means for at least one of receiving data at the SDIO client to transfer to the SDCC host and receiving data from at least one SDCC host application, and means for generating a host interrupt when data is received at the SDIO client. Furthermore, when a packet is received from a SDCC host application, the mobile computing apparatus may also comprise means for performing a CMD 53 write operation and means for changing the SDCC host feature to the active state.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings, where like or similar elements are designated with identical reference numerals throughout the several views and wherein:

DETAILED DESCRIPTION

Figure 1:
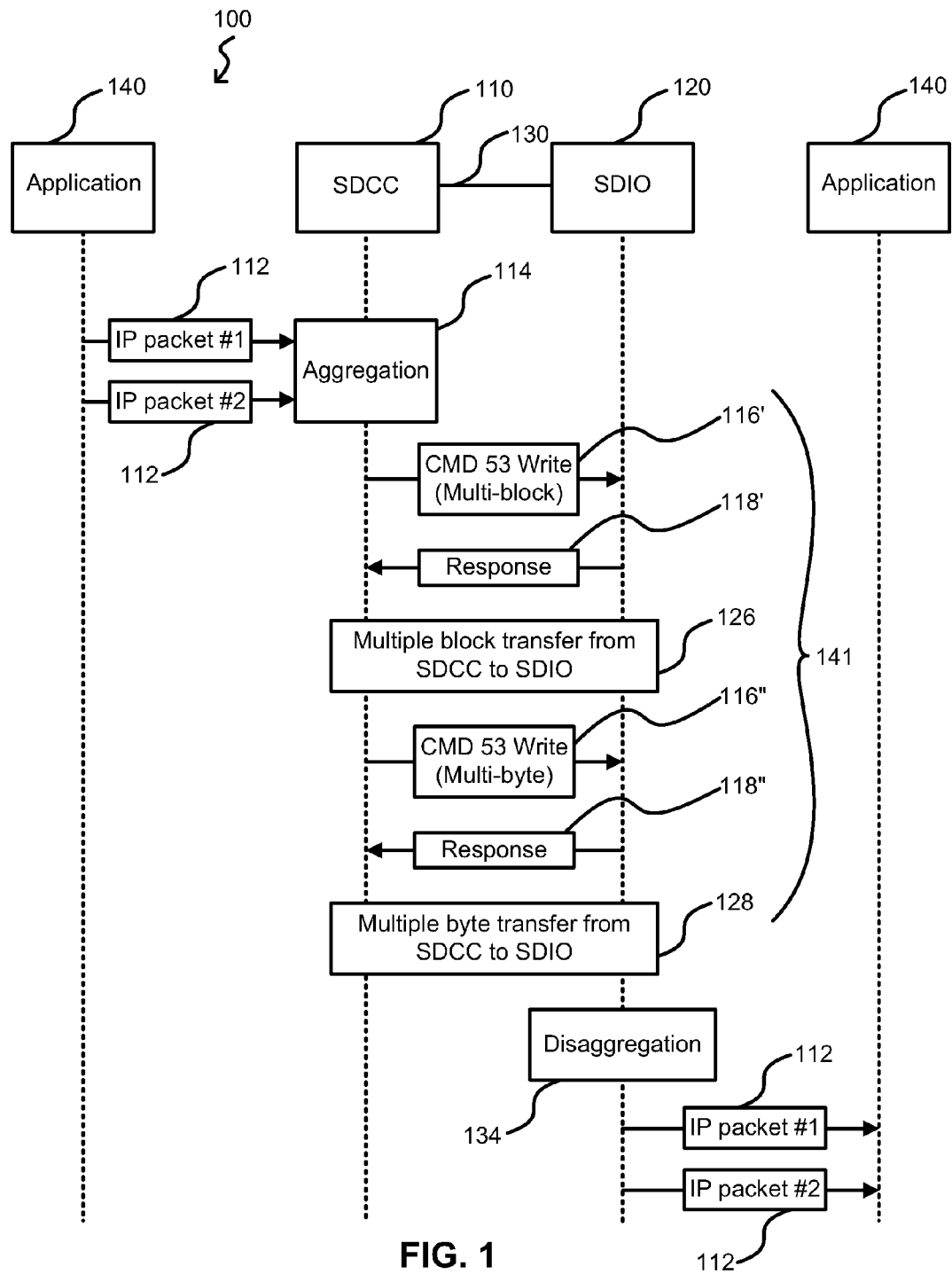
FIG. 1 illustrates a block diagram of an aggregate transfer of IP packets from a SDCC host to a SDIO client according to one embodiment of the invention.
Figure 2:
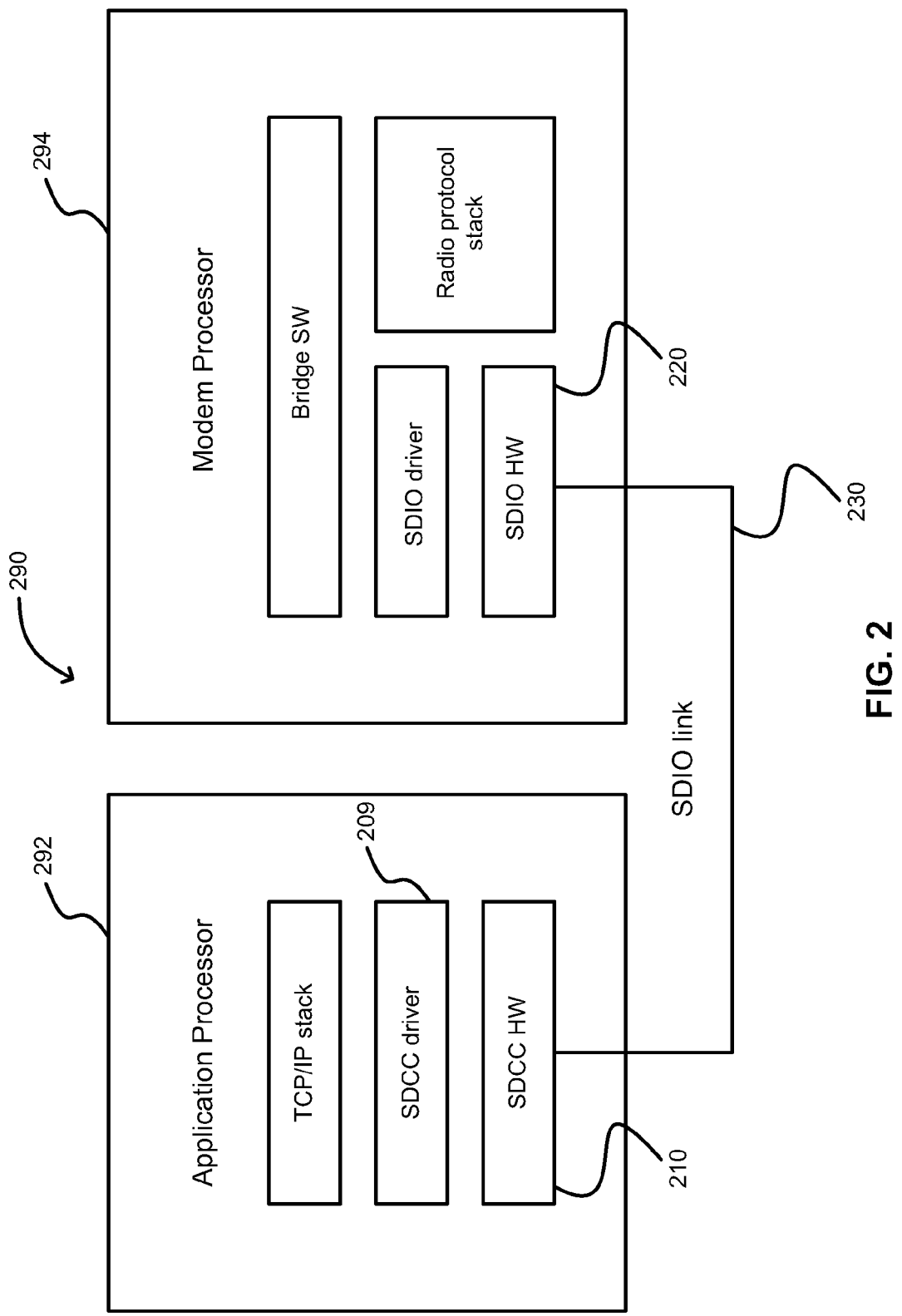
FIG. 2 illustrates a block diagram of a mobile computing device comprising an SDIO link between a SDCC host and a SDIO client of an exemplary embodiment of the present invention.
Figure 3:
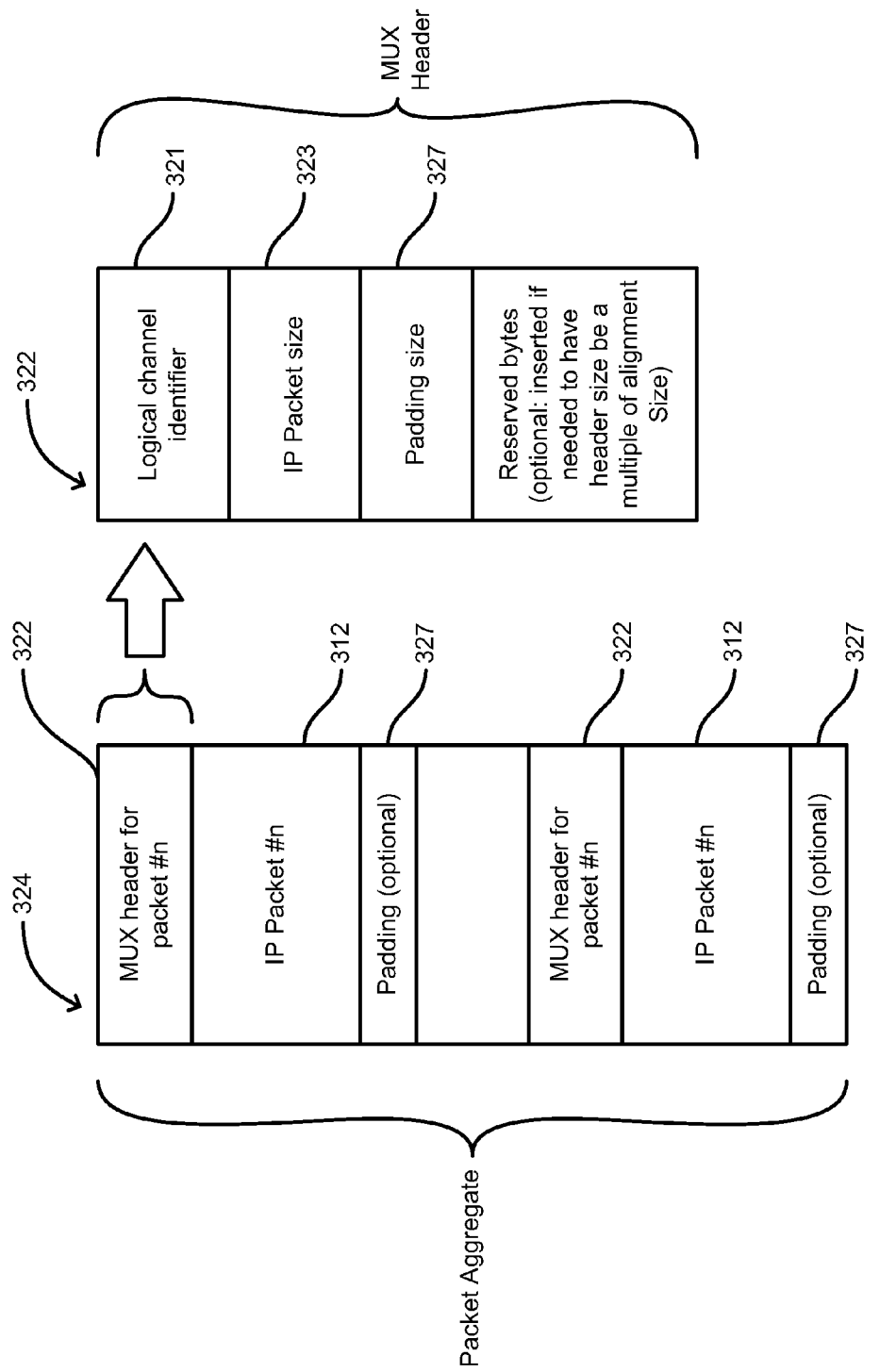
FIG. 3 illustrates IP packet aggregation sequencing and header information according to one embodiment of the present invention.

One embodiment of the invention comprises a non-transitory, tangible computer readable storage medium, encoded with processor readable instructions to perform a method of transferring SDIO data. Seen in FIG. 1 is a representation of one method 100 of transferring an aggregate of SDIO data from a SDCC host 110 to a SDIO client 120 across an SDIO interface 130, which may also be referred to an interface or a SDIO interface bus. As seen in FIG. 2, the SDCC host 210 may comprise SDCC hardware (HW) electronically coupled via the SDIO interface 230 to the SDIO client 220, which may comprise SDIO hardware (HW). Returning to FIG. 1, in one method, the SDCC host 110 may receive multiple IP packets 112 from an application 140 running on a mobile computing device. Two IP packets 112 are represented in FIG. 1, though it is contemplated that a greater number of IP packets 112 may be received at the SDCC host 110. An aggregation 114 of the multiple IP packets 112 is then performed at the SDCC host 110 prior to sending the IP packets 112 to the SDIO client 120, thereby buffering the multiple IP packets 112 at the SDCC host 110. During the aggregation 114, a header may be coupled to each of the multiple IP packets 112. Seen in FIG. 3 is one example of an aggregate 324 of IP packets 312 with each IP packet 312 comprising a header 322. The header 322 may be referred to as a multiplexing header.

Figure 4:
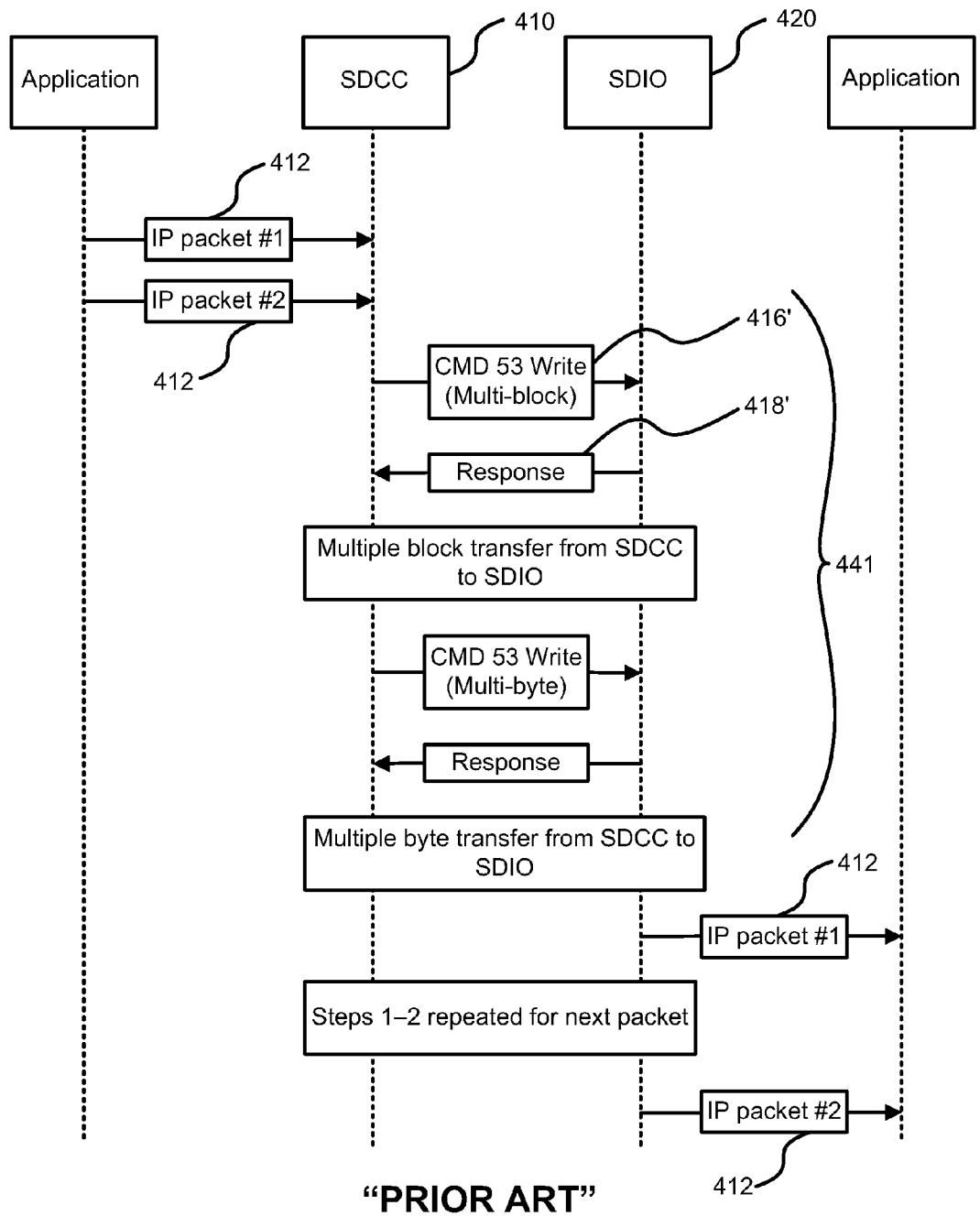
FIG. 4 illustrates a block diagram of a prior art non-aggregate transfer of IP packets from a SDCC host to a SDIO client.

In one embodiment, upon receiving the IP packets 112 at the SDCC host 110, the SDCC host 110 issues a first CMD 53 Write Command 116' to the SDIO client 120. The first CMD 53 Write Command 116' may comprise a command similar to a CMD 53 Write Command 416' seen in FIG. 4 issued from a SDCC host 410 that is not performing the packet aggregation 114 seen in FIG. 1. For example, the first CMD 53 Write Command 116' of FIG. 1 may comprise control information for transferring the data. The first CMD 53 Write Command 116' may also specify the amount of data to be transferred. The SDIO client 120 may provide a first response 118' to the SDCC host 110. The first response 118' may be similar to a first response 418' seen in FIG. 4 issued from a SDIO client 120 not involved in the packet aggregation 114 seen in FIG. 1. For example, the first response 418' may acknowledge the first CMD 53 Write Command 116'.

Upon receiving the first response 118', the SDCC host 110 initiates a multiple block transfer of data 126. The multiple block transfer for data 126 transfers multiple IP packets from the SDCC host 110 to the SDIO client 120, assuming that multiple IP packets 112 are pending. In one embodiment, each pending IP packet 112 comprises an MTU packet size of about 1500 bytes, and each block of data in the multiple block transfer 126 may comprise a preconfigured block size on-the-order of 256 bytes. Upon completing the multiple block transfer of data 126, a second CMD 53 Write Command 116" is initiated to begin the transfer any remaining bytes not included in the multiple block transfer 126. The second CMD 53 Write Command 116" may comprise a similar command to the first CMD 53 Write Command 116'. Upon receiving a second response 118" from the SDIO client 120, the remaining bytes are sent to the SDIO client 120 in a multiple byte transfer of data 128.

The transfer of the entirety of the pending IP packets 112 in the multiple block transfer of data 126 and the multiple byte transfer of data 128, along with the first and second CMD 53 Write Command 116' 116", and the first and second responses 118', 118" comprise a single SDIO transfer 141. The single SDIO transfer 141 comprises a SDIO transfer of buffered data. In FIG. 4 is a prior art representation of data transfer for 2 IP packets 412 from a SDCC host 410 to a SDIO client 420 without aggregation. As seen, a single SDIO transfer 441 must occur for each IP packet 412 to be transferred. Therefore, in the FIG. 4 prior art, the single SDIO transfer 441 must be repeated in order to transfer each IP packet 412 from the SDCC host 410 to the SDIO client 420. By transferring all the packets 112 in one single SDIO transfer 141, less AP CPU interrupts occur and packet overhead is diminished, allowing the IP packets 112 to be transferred more quickly than the prior art seen in FIG. 4.

Returning to FIG. 1, upon receiving the entirety of the data transfer in the single SDIO transfer 141, the SDIO client 120 separates the data into individual IP packets 112 through the step of disaggregation 134. For example, the header 322 seen in FIG. 3 attached to each IP packet 312 may comprise enough information for the SDIO client 120 to separate and place each packet 312 in its proper order. In one embodiment, the header 322 may comprise enough information to indicate the end of the IP packet 312 associated with the header 322, as well as identify the beginning of the next packet 312 in the aggregation of IP packets. As seen in FIG. 3, one header 322 comprises a length field 323 defining the size of the IP packet 312.

Figure 5:
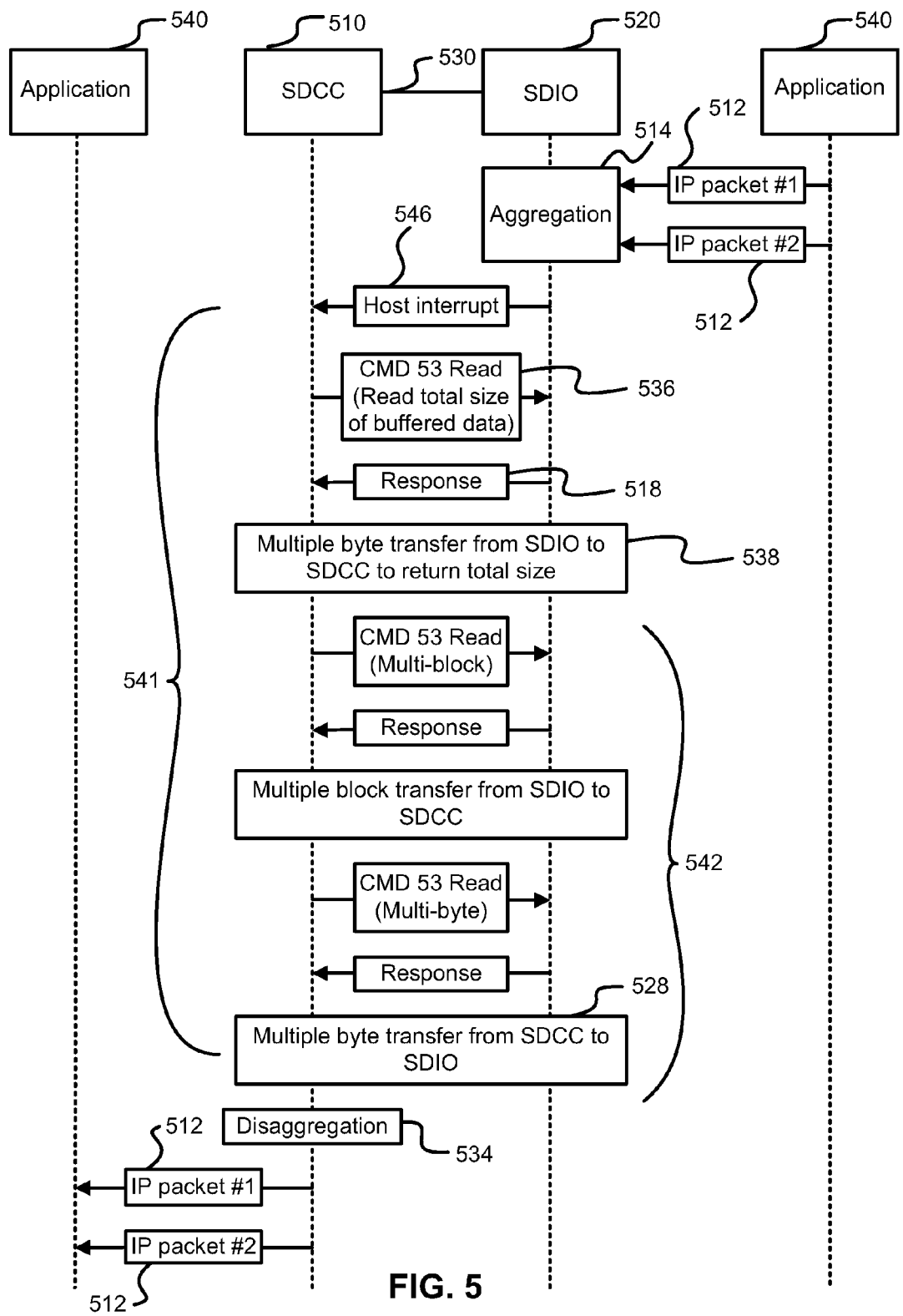
FIG. 5 illustrates a block diagram of an aggregate transfer of IP packets from a SDIO client to a SDCC host according to one embodiment of the invention.
Figure 6:
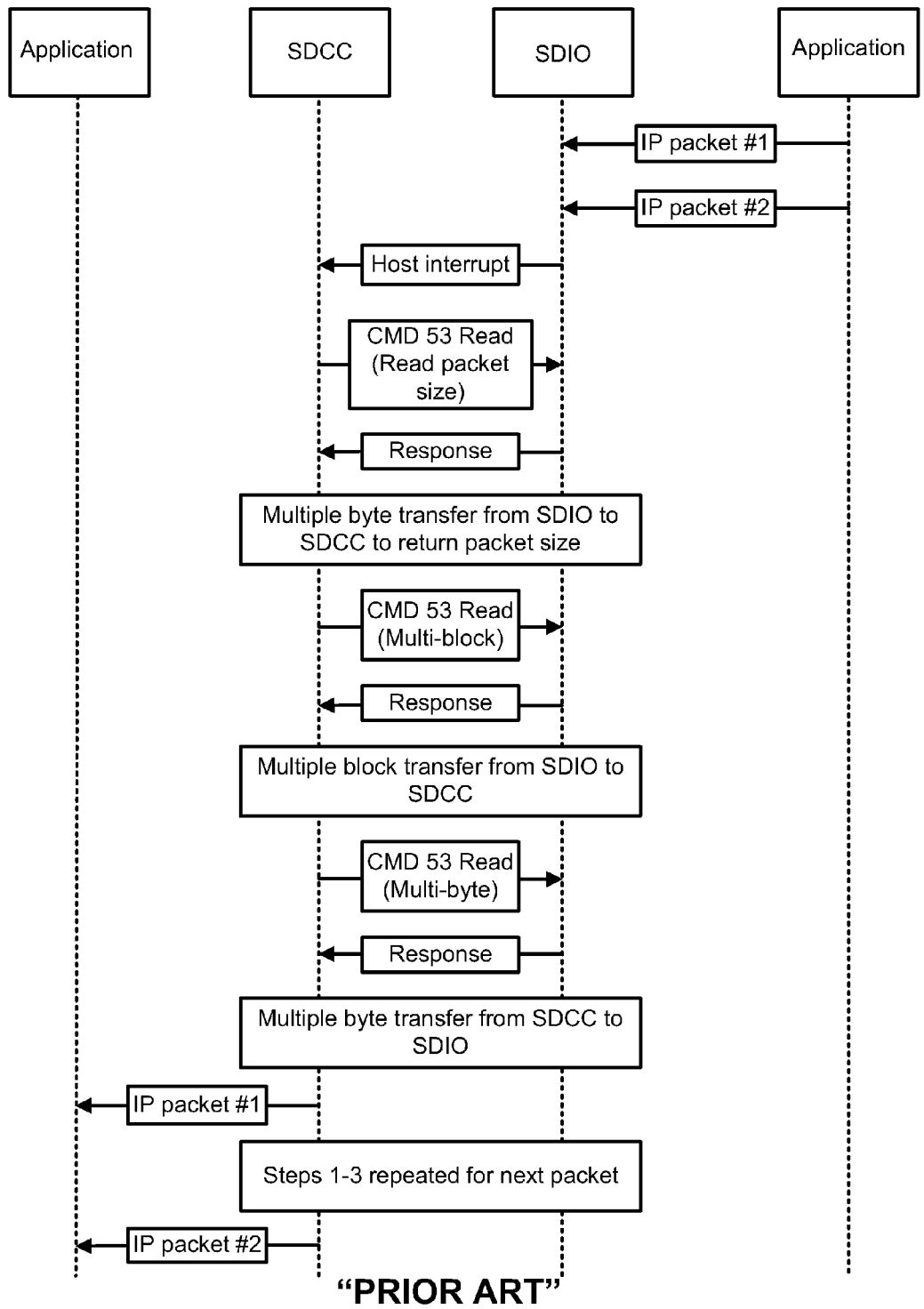
FIG. 6 illustrates a block diagram of a non-aggregate transfer of IP packets from a SDIO client to a SDCC host according to the prior art.

Similar to the IP packet 112 transfer seen in FIG. 1, FIG. 5 comprises a single SDIO transfer 541 of data from a SDIO client 520 to the SDCC host 510. Data transfer from the SDIO client 520 to the SDCC host 510 may also be referred to as a host read or a downlink transfer. Like FIG. 1, where transferring the packets 112 in one single SDIO transfer 141, allows the IP packets 112 to be transferred more quickly than the prior art seen in FIG. 4, the same principle applies to FIG. 5—transferring multiple packets 512 in a single SDIO transfer 541 allows for the packets 512 to be transferred more quickly than a similar prior art embodiment, seen in FIG. 6. The single SDIO transfer 541 in the downlink direction is similar to the single SDIO transfer 141 seen in FIG. 1 in transferring the data from the SDCC host 110 to the SDIO client 120 (the uplink or host write direction). However, as seen in FIG. 5, upon receiving one or more IP packets 512 at the SDIO client 520 from the application 540 to transfer to the SDCC host 510, the initiation of the single SDIO transfer 541 comprises the SDIO client 520 issuing a host interrupt 546. The host interrupt 546 initiates a first CMD 53 Read Command 536 from the SDCC host 510 to the SDIO client 520. The SDIO client provides a first response 518. Upon receiving the first response 518, a multiple byte transfer 538 from the SDIO client 520 to the SDCC host 510 may occur to obtain the total size of all IP packets 512 buffered at the SDIO Aggregation 514. The remaining steps 542 in the single SDIO transfer 541 from the SDIO client 520 to the SDCC host 510 are substantially similar to the single SDIO transfer 141 seen in FIG. 1 to transfer data from the SDCC host 110 to the SDIO client 120.

In one embodiment, FIG. 1 and FIG. 5 IP packets 112, 512 transferred in the single SDIO transfer 141, 541 may comprise multiple logical channels. In such an embodiment, the multiplexing header 322 of FIG. 3 can encode a logical channel identifier 321 to identify the associated logical channel for each packet 312. Therefore, the disaggregation 134, 534 may demultiplex the multiple IP packets 112, 512 into multiple logical channels.

In some architectures, SDIO performance may benefit from aligning each aggregated IP packet 312 to a word boundary. For example, it may help to align the IP packet 312 with a word length comprising 4 bytes or 8 bytes. To facilitate this alignment without requiring additional memory copies on the receiving end of the data, the header 322 can be defined so as to adjust the IP packet 312 to be a multiple of the required alignment size. For example, since each IP packet 312 may comprise a different size, the header may further comprise a padding 327 to ensure that the total length of the IP packet is a multiple of the alignment size. An appropriate number of padding bytes can also be inserted at the end of the IP packet 312.

One embodiment of the invention may also comprise a single SDIO transfer 141, 541 where the multiple byte transfer of data 128, 528 is sent in a subsequent single SDIO transfer 141. When transferring large amounts of data across the SDIO interface 130, 530, multiple single SDIO transfers 141 may occur. Therefore, it may be advantageous to combine the multiple byte transfer of data 128, 528 with a subsequent multiple byte transfer of data 128, 528. In an embodiment comprising a postponement of a multiple byte transfer of data 128, 528, the disaggregation 134, 534 would receive, process and reassemble partial IP packets 112, 512 before forwarding the packet 112, 512 to the application 140, 540.

In one embodiment, a single first CMD 53 Write command 116' or read command 536 may comprise control information for both read (downlink, seen in FIG. 5) and write (uplink, seen in FIG. 1) operations. For example, if IP packets 112 are pending to be sent from the SDCC host 110 to the SDIO client 120 as seen in FIG. 1 and IP packets 512 are pending to be sent from the SDIO client 520 to the SDCC host 510 as seen in FIG. 5, either a single first CMD 53 Write operation 116' and response 118' or a single first CMD 53 Read operation 536 and response 518 may read registers at both the SDCC host 110 and the SDIO client 120 for both operations. This may decrease the number of CMD operations that may be sent across the interface 130, 530, thereby the "cost" in processing time for performing the control read may be reduced, allowing for a quicker transfer of data.

Figure 7:
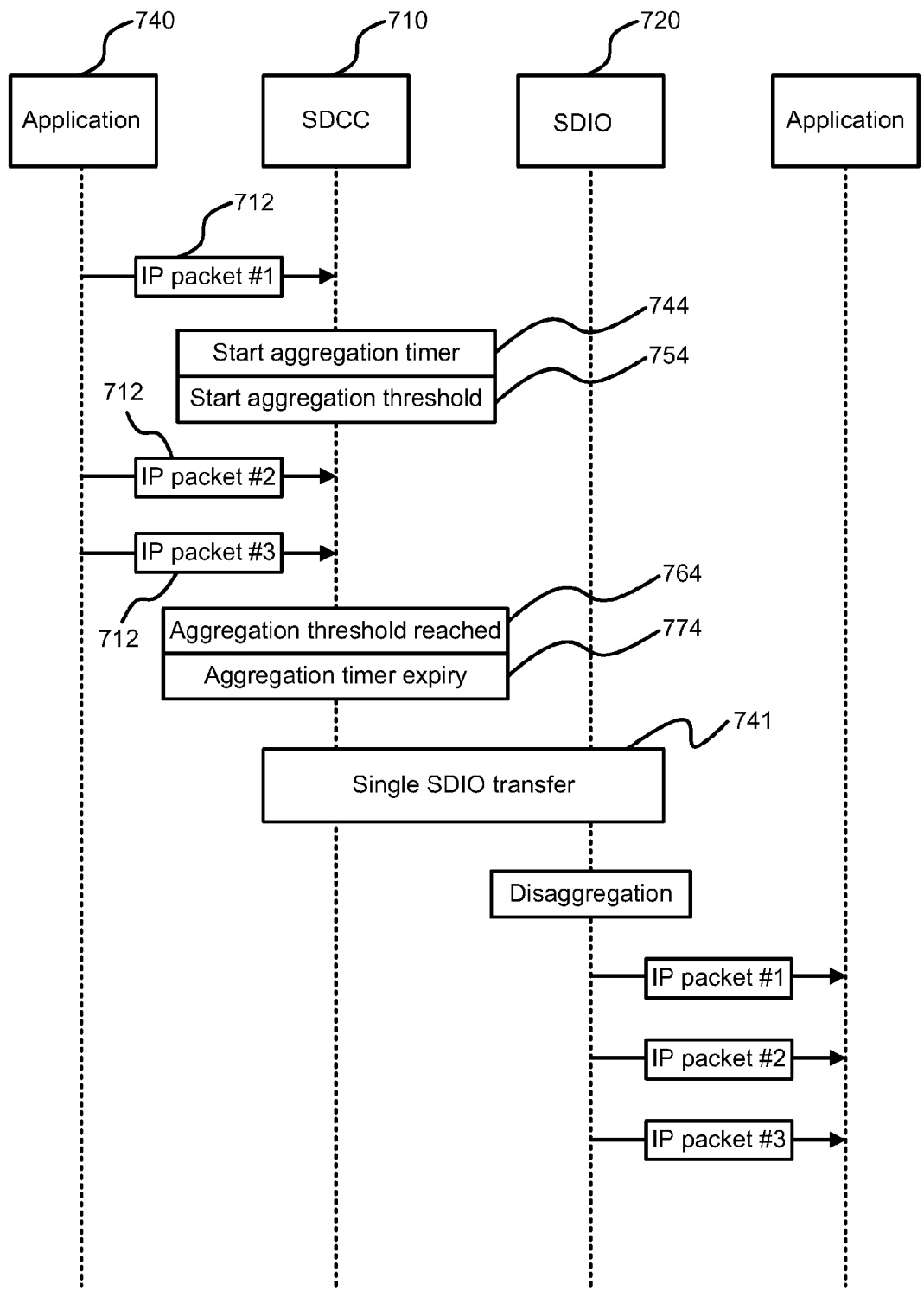
FIG. 7 illustrates a block diagram of an aggregate transfer of IP packets from a SDCC host to a SDIO client, including an aggregation timer and an aggregation threshold, according to one embodiment of the invention.

Seen in FIG. 7 is one embodiment of the invention comprising an aggregation timer and aggregation threshold. As seen, an aggregation timer is initiated 744 and an aggregation threshold is set 754 after receiving a first IP packet 712. Initiating the aggregation timer and threshold may force additional aggregation of IP packets 712. For example, to avoid the situation where an IP packet 712 is received at the SDCC 710 and sent to the SDIO 720 prior to the SDCC 710 receiving another IP packet (e.g. the SDCC driver 209 seen in FIG. 2 does not get the opportunity to aggregate), a target aggregation threshold may be defined on the sender side, which, in FIG. 7, is the SDCC 710. Once the threshold is reached 714, the data transfer 741 is initiated for the entire buffered IP packet 712 aggregate in one shot. In the uplink direction seen in FIG. 7, the SDCC host 710 driver may buffer IP packets 712 submitted by the application 740 until the threshold is reached 764. One threshold may be set 754 to four kb, though other threshold limits are also contemplated. The threshold may be an adjustable threshold, and may be set by the user. When the aggregation threshold is reached 764, as seen in FIG. 7, a single SDIO transfer 741 is used to transfer the buffered data from the SDCC host 710 to the SDIO client 720. The single SDIO transfer 741 may be substantially similar to the single SDIO transfer 141 seen in FIG. 1.

Figure 8:
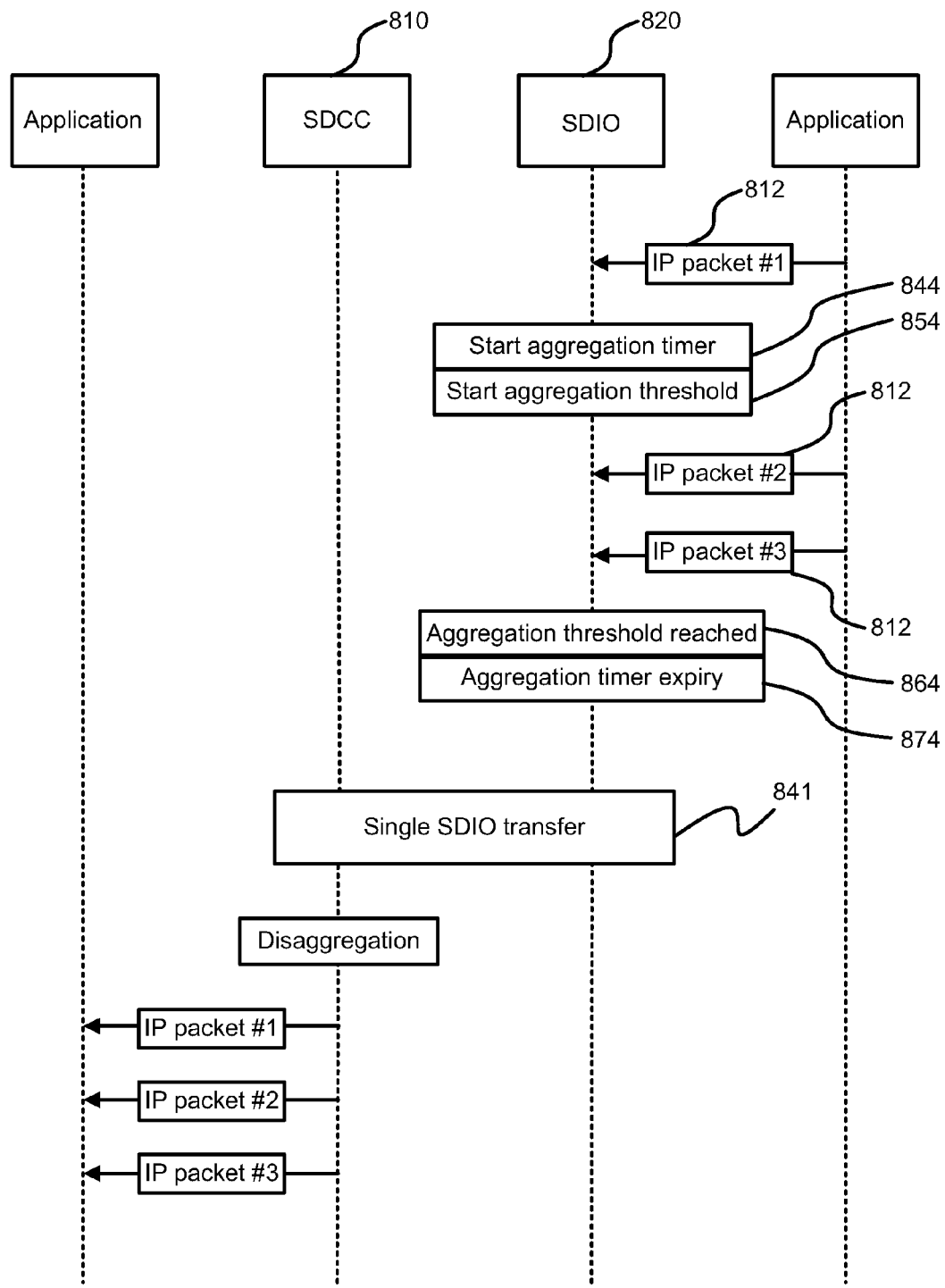
FIG. 8 illustrates a block diagram of an aggregate transfer of IP packets from a SDIO client to a SDCC host, including an aggregation timer and an aggregation threshold, according to one embodiment of the invention.

Seen in FIG. 8 is a transfer of IP packets 812 from a SDIO client 820 to a SDCC host 810, wherein an aggregation timer is initiated 844 and an aggregation threshold is also initiated 854 on the SDIO client. In the downlink direction seen in FIG. 8, upon reaching the aggregation threshold 864 or expiration of an aggregation timer 874, a single SDIO transfer 841 occurs to transfer all buffered packets 812 to the SDCC host 810. Seen in FIG. 5 is one example of a single SDIO transfer 841 comprising a host interrupt 546, which may initiate the CMD 53 Read command 536 to read the data buffered at the SDIO client 820 in one shot.

The embodiments seen in FIGS. 7 and 8 comprising an initiation of an aggregation threshold 754, 854 also comprise starting an aggregation timer 744, 844. Starting an aggregation timer 744 844 at the same time as starting the aggregation threshold 754 854 prevents any unbounded latencies in the aggregation threshold. The aggregation timer may comprise a maximum time for which the sender (SDCC host 710 in FIG. 7, SDIO client 820 in FIG. 8) will wait for the target aggregate threshold to be reached, and the maximum time may be a configurable value. For example, a 1 ms timer value may be used in Long Term Evolution (LTE) radio to align with the Transmission Time Interval (TTI) on the radio interface.

As seen, in the FIG. 7 uplink direction, upon receiving the first IP packet 712 from the application 740, the aggregation timer is started 744. In one embodiment, starting the aggregation timer 744 occurs when the aggregation timer is not already running. After the aggregation timer is running, any further IP packets 712 deposited by the application 740 at the SDCC host 710 will be buffered until either the timer expires 774 or the desired aggregate threshold is reached 764. When either event occurs, the timer is stopped if running and the single SDIO transfer 741 is initiated at the next opportunity. In the downlink direction seen in FIG. 8, a similar strategy may be employed, with the SDIO client 820 side running the timer. The timer is started 844 when an IP packet 812 is received from upper layers to be sent to the SDCC host 810 and the timer is not already running. Once the timer expires 874 or the desired threshold is reached 864, the SDIO client 820 notifies the SDCC host 810 of data availability through the single SDIO transfer 841, which, as seen in FIG. 5 includes a host interrupt 546. The SDCC host 820 then begins a read operation 536 for the available data. One aggregate threshold in FIGS. 7 and 8 may comprise an eight kb threshold. However, other threshold amounts are contemplated.

One embodiment comprising starting an aggregation timer 844 and/or an aggregation threshold 854 in the downlink direction seen in FIG. 8 may comprise the SDCC host 810 running the timer for the aggregation instead of the SDIO client 820 seen in FIG. 8. In such an embodiment, the timer may comprise a periodic timer that is restarted whenever a read operation 536, as seen in FIG. 5, is completed. Furthermore, whenever the timer expires, the SDCC host 810 may initiate a single SDIO transfer 841 to read any data buffered up to that point on the SDIO client side 820.

Turing to FIG. 2, seen is one embodiment of a mobile computing device 290 comprising a first processor 292 and a second processor 294. The first processor 292 may be operatively coupled to a first end of a communication interface 230 and the second processor 294 may be operatively coupled to a second end of the communication interface. The communication interface may comprise an SDIO Interface 230. The communication interface in one embodiment is adapted to buffer multiple data packets received at the first end and second end of the interface, attach a multiplexing header to each of the multiple data packets, and transfer the multiple data packets between processors in a single transfer operation. As discussed above, each multiplexing header may comprise the header 322 seen in FIG. 3, which may comprise a length field 323. The length field 323 may indicate an end of an attached data packet which may comprise an IP packet 312, and may include padding 327 adapted to ensure that the total size of the IP packet 312 and header 322 (including the padding 327) comprises a multiple of a specific data amount, such as 4 kb. The specific data amount may also be referred to as an alignment size. The header 322 may also comprise information indicating a beginning of another IP packet 312 and a logical channel identifier 321. It is to be appreciated that although the term IP packet 312 is used throughout the application in reference to a type of data packet, any other type of data packet comprising an alternative protocol may also be used in the place of the IP packet. For example, any of the two hundred and fifty-five protocols comprising one of the Internet Assigned Numbers Authority may be used as a data packet.

In FIG. 8 shows that the aggregation timer 844 is started on the SDIO client 820. As described above, the aggregation timer 844 may also be run on the SDCC host 810 in the downlink direction. However, since the SDCC host 810 does not know when there is pending data to be read from the SDIO client 820, if the aggregation timer 844 is run on the SDCC host 810 in the downlink direction, as stated, the timer may be a period timer. However, running a periodic timer on the SDCC host 810 may be avoided by allowing the SDCC host 810 to configure the aggregation threshold used by the SDIO client 820. In one embodiment, the SDIO client 820 may comprise a register adapted to hold a SDIO client 820 aggregation threshold value that can be written to by the SDCC host using a CMD 53 write operation.

Figure 9:
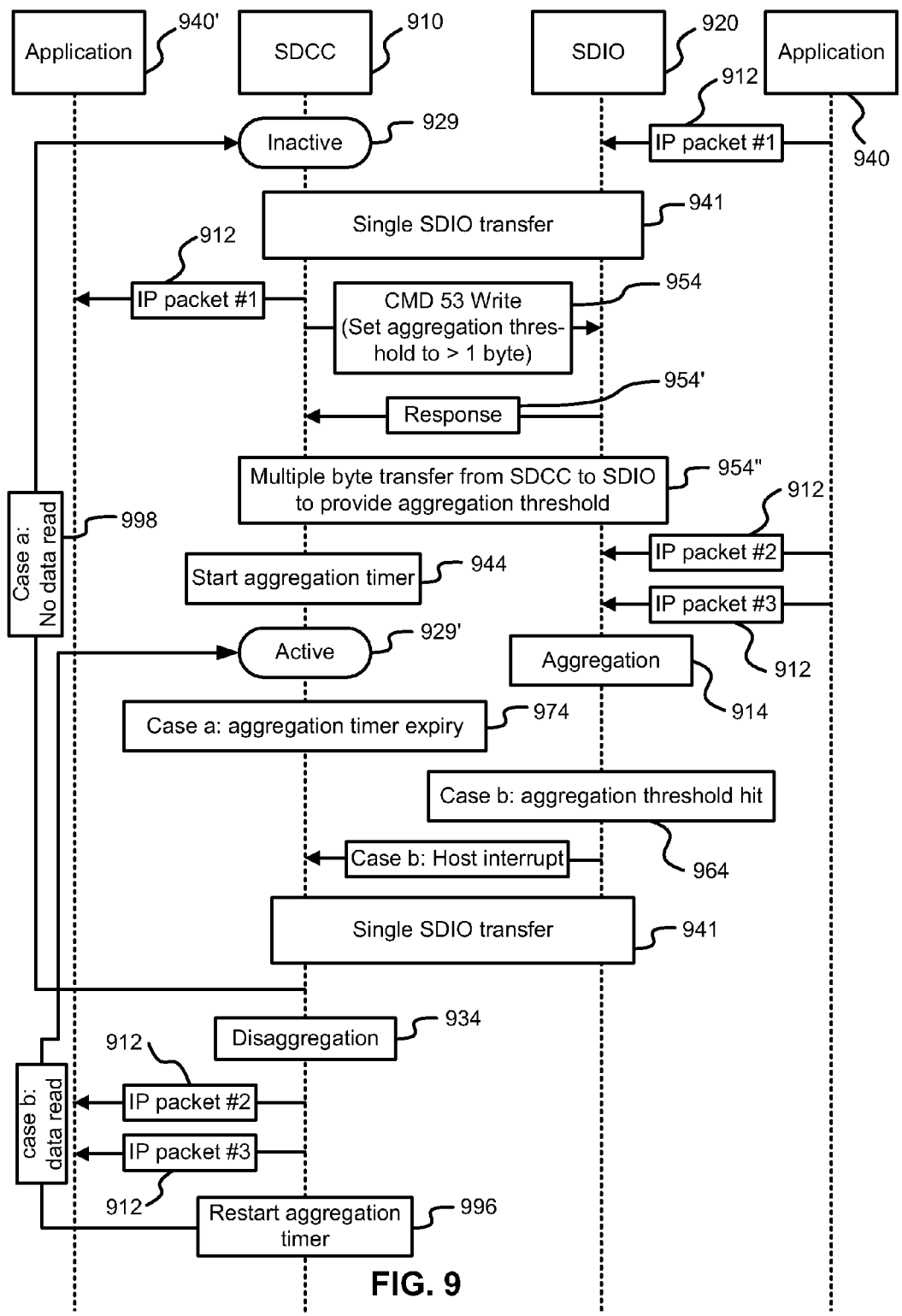
FIG. 9 illustrates a block diagram of an aggregate transfer of IP packets from a SDIO client to a SDCC host, including a 2-state machine according to one embodiment of the invention.

In one embodiment, as seen in FIG. 9, the SDCC host 910 may comprise a configurable feature such as a two-state machine adapted to control the SDIO client's 920 aggregation behavior. In one embodiment the two-state machine initially comprises an INACTIVE 929 state. The INACTIVE state may comprise no SDIO client 920 aggregation by configuring the SDIO client 920 register to an aggregation threshold of 1 byte. Furthermore, in the INACTIVE 929 state, no aggregation timer may be running. Therefore, when the SDIO client 920 receives an IP packet 912 from an application 940 in the INACTIVE 929 state, the SDIO client 920 generates a single SDIO transfer 941 for the IP packet 912. The steps of the single SDIO transfer 941 are substantially similar to the FIG. 5 single SDIO transfer 541, with the initial step comprising a host interrupt 546 being generated. Returning to FIG. 9, the single IP packet 912 is therefore transferred to the SDCC host 910 without aggregation, so there is no aggregation latency in transferring the first IP packet 912. No first IP packet 912 aggregation latency may be advantageous when IP packets 912 are being transferred intermittently, such as for an interactive application. Furthermore, although FIG. 9 only displays that a single IP packet 912 is received at the SDIO client 920 (and transferred to the SDCC host 910), it is contemplated that more than one IP packet may be transferred to the SDCC host 910 without aggregation in the single SDIO transfer 941. In any event, when the single SDIO transfer 941 is initiated and the host interrupt 546 seen in FIG. 5 is received at the SDCC host 910 while the two-state machine comprises an INACTIVE 929 state, the SDCC host 910 is adapted to change the two-state machine to an ACTIVE 929' state. Additionally, the SDIO client 920 aggregation threshold is set to a value greater than 1 byte, which may be done through a CMD 53 Write command 954, response 954', and multiple byte transfer 954" that provides the aggregation value and SDIO client 920 register location. Furthermore, an aggregation timer 944 may be started on the SDCC host 910.

In the ACTIVE state 929', aggregation 914 occurs at the SDIO client 920 for any IP packets 912 received and one of two conditions may occur. The aggregation timer may expire 974 or the aggregation threshold may be achieved 964. When the latter condition occurs and the aggregation threshold is hit 964, a single SDIO transfer 941 is begun. Seen in FIG. 5 is one example of a single SDIO transfer 541. A similar single SDIO transfer 941 occurs after the aggregation timer expiry 974, however, no host interrupt 546 is required and the SDCC host 910 just performs a CMD 53 Read operation similar to the CMD 53 Read operation 536 seen in FIG. 5 to read the buffered data at the SDIO client 920. When a non-zero amount of data is read when the aggregation timer expires 974, the IP packets 912 are received at the SDCC host 910, disaggregated 934, and submitted to the Application 940'. Furthermore, the state remains ACTIVE and the aggregation timer is restarted 996. However, if no data is read 998 upon expiry of the aggregation timer 974, the state is changed back to inactive 929 and the aggregation timer is not restarted. When the aggregation threshold is achieved 964, the single SDIO transfer 941 occurs with the host interrupt 546 seen in FIG. 5. Furthermore, when the aggregation threshold is achieved 964, the aggregation timer is restarted 996 and the state remains ACTIVE. It is contemplated that the aggregation timer seen in FIG. 9 may also operate on the SDIO client 920.

Figure 10:
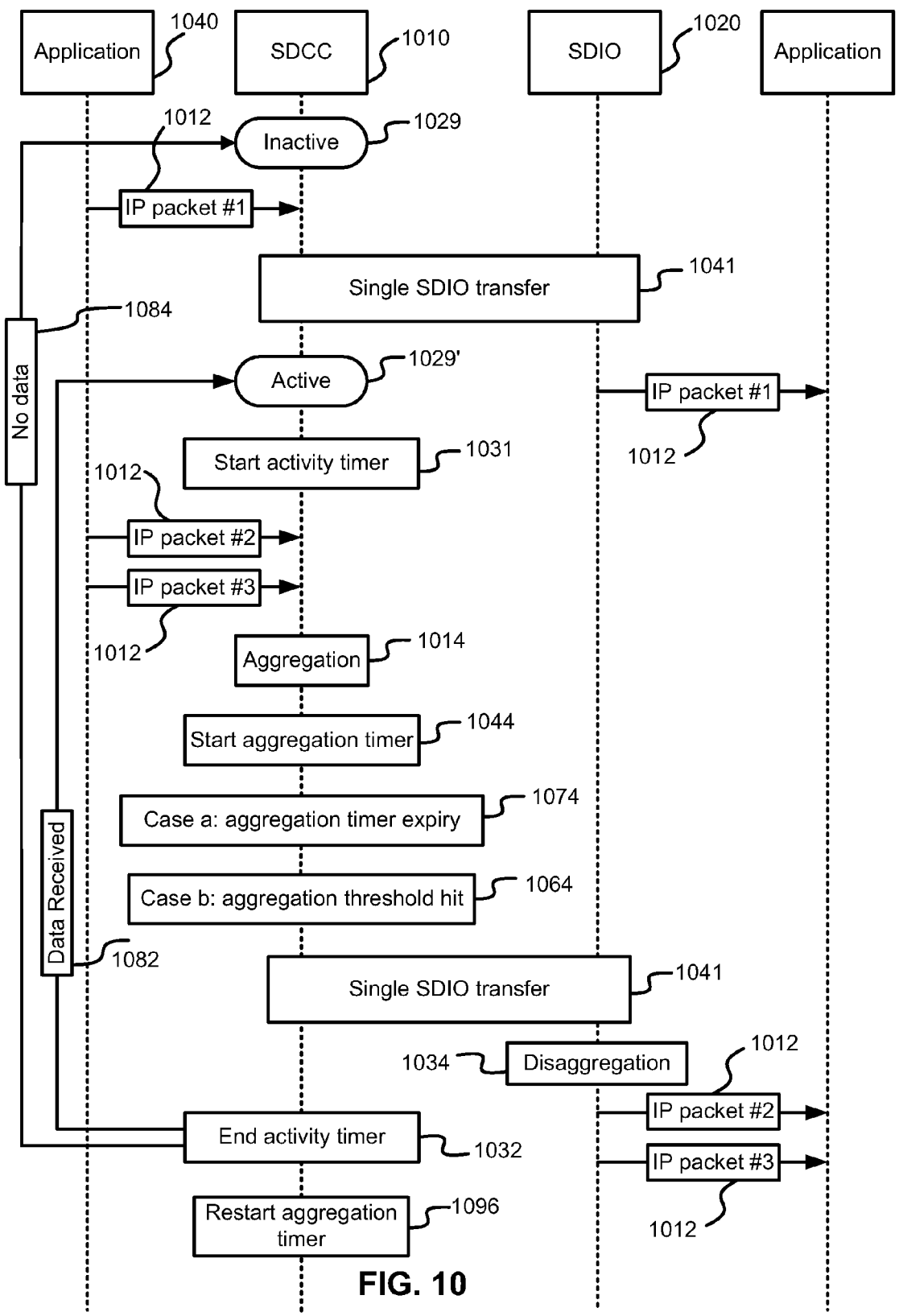
FIG. 10 illustrates a block diagram of an aggregate transfer of IP packets from a SDCC host to a SDIO client, including a 2-state machine according to one embodiment of the invention.

A similar operation may occur in the uplink direction, as seen in FIG. 10. For example, the SDCC host 1010 may maintain a similar state machine for controlling aggregation. The state may initially comprise an INACTIVE state 1029 where aggregation is not performed. For example, when an IP packet 1012 arrives at the SDCC host 1010 from an application 1040, the IP packet 1012 is not aggregated and a single SDIO transfer 1041 occurs for the IP packet 1012. Upon receiving the IP packet 1012 in the INACTIVE state, the state is then changed to the ACTIVE state 1029' and an activity timer is initiated 1031. When IP packets 1012 arrive in the ACTIVE state 1029', the packets 1012 are aggregated 1014 and the aggregation timer is started 1044. When the aggregation timer expires 1044 or the aggregation threshold is reached 1064, a single SDIO transaction 1041 occurs and all the buffered data is sent to the SDIO client 1020 and disaggregation 1034 occurs. The aggregation timer is then restarted 1096.

The state continues to remain ACTIVE 1029' while the activity timer is running. When the activity timer expires 1032, the SDCC host 1010 determines whether data was received from one or more applications 1040 while the activity timer was running. When data was received 1082, the state remains ACTIVE 1029' and the activity timer is restarted 1031. When the SDCC host 1010 determines at the expiry of the activity timer 1032 that no data 1084 was received from one or more applications 1040 while the activity timer is running, the state is changed to INACTIVE 1029 and the activity timer is not restarted. In one embodiment, the aggregation timer may be running when the activity timer is stopped 1032, the state is changed to INACTIVE 1029, and the activity timer is not restarted because no data was received 1084 while the activity timer was running. When the aggregation timer expires 1074 in the INACTIVE state 1029, a Single SDIO transaction 1041 may occur. If a non-zero amount of data is transferred during the single SDIO transaction 1041, the state may be changed to ACTIVE 1029', otherwise the state may remain INACTIVE 1029. It is contemplated that the activity timer and the aggregation timer may comprise different values and that the embodiment seen in FIG. 10 may operate properly when the activity timer is less than, equal to, or greater than the aggregation timer value. In one embodiment, the activity timer comprises a value one of greater than and equal to the aggregation timer. Furthermore, though separate activity and aggregation timers can be employed, it is also contemplated that the aggregation timer may also be used as the activity timer. In such an embodiment, the aggregation timer may be restarted 1096 when the state changes to ACTIVE 1029'. When the aggregation timer expires 1074 and no buffered data is waiting to be sent, the state is changed back to INACTIVE 1029. A two-state mechanism as seen in FIGS. 9 and 10 may also be implemented on the SDIO client 1020 and the aggregation timer may be run on the SDIO client 1020.

Figure 11:
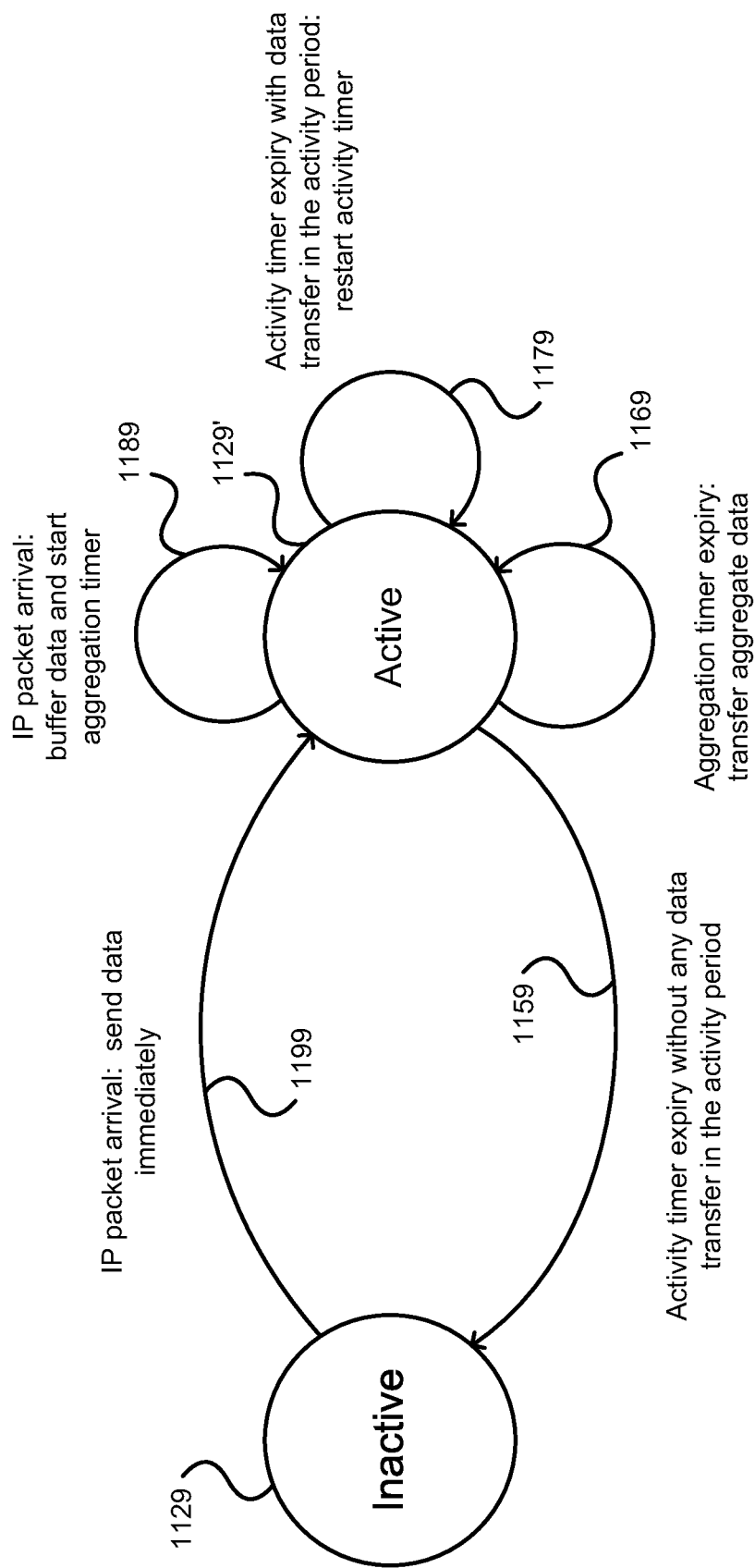
FIG. 11 illustrates a block diagram of the operation of 2-state machine in FIGS. 9 and 10, according to one embodiment of the invention.

Seen in FIG. 11 is a block diagram of the two-state machine described in FIGS. 9 and 10. In FIG. 11, the two-state machine can run on either the SDIO client 920/1020 or the SDCC host 910/1010. As seen at 1199, when the two-state machine is in the INACTIVE state 1129, and an IP packet arrives at either the SDIO client 920/1020 or the SDCC host 910/1010, the data is sent substantially immediately to the other of the SDIO client 920/1020 and SDCC host 910/1010 and the state may be changed to ACTIVE 1129'. At this point, and as seen at 1189, when an additional IP packet arrives at either the SDIO client 910/1010 or the SDCC host 920/1020, the packet may be buffered and the aggregation timer started. At 1179, when the activity timer expires with data transfer occurring while the activity timer was running, the state remains ACTIVE 1129' and the activity timer is restarted. At 1169, when the aggregation timer expires, the state remains ACTIVE 1129' and any buffered IP packets are transferred. However, when the activity timer expires at 1159 in the ACTIVE state 1129' and no data has been transferred while the activity timer was running, the state is changed to INACTIVE 1129.

Figure 12:
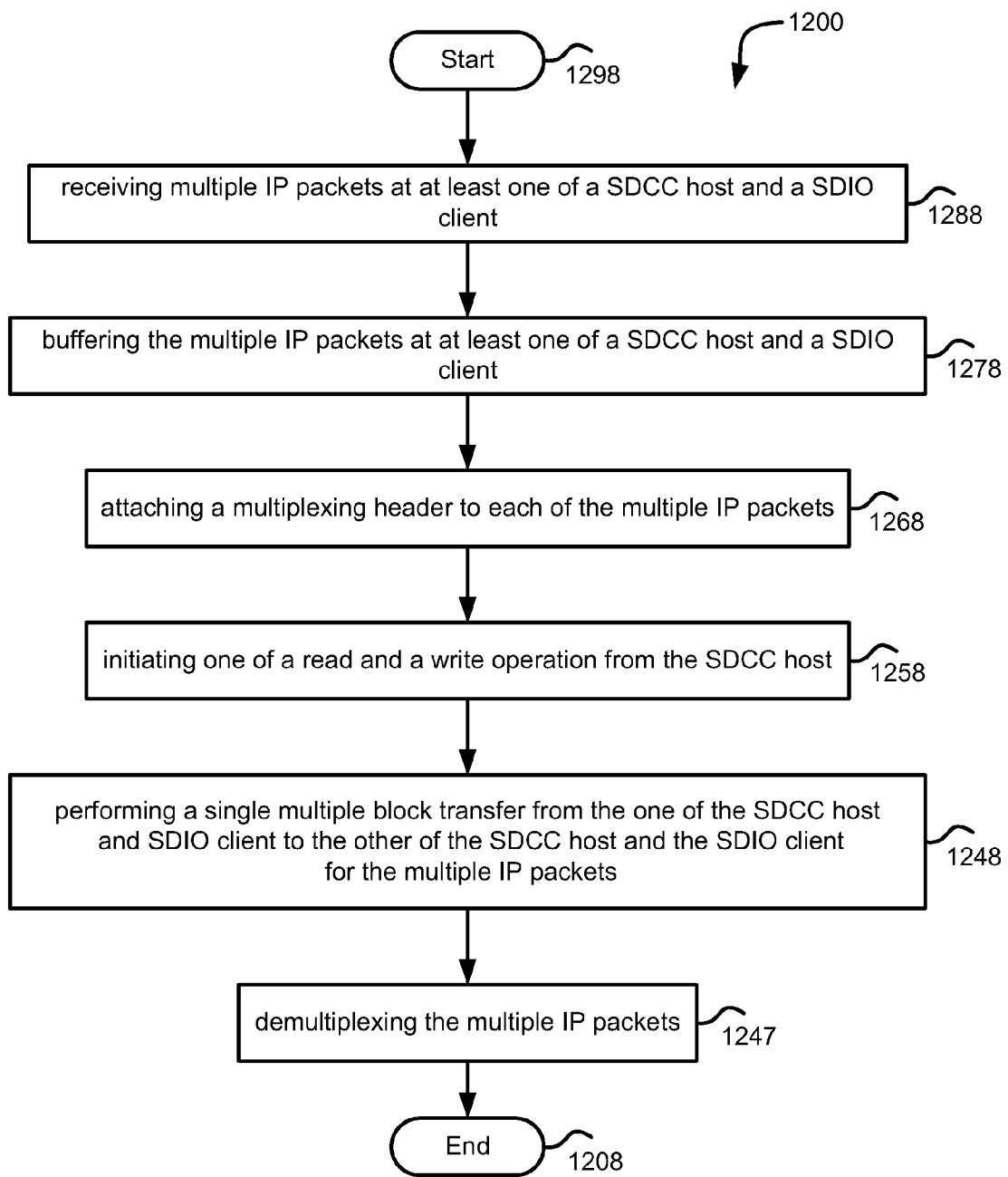
FIG. 12 is a flow chart that depicts a method that may be carried out in connection with the embodiments described herein.

In turning now to FIG. 12, seen is a method 1200 of transferring data across an SDIO link such as the interface 230 seen in FIG. 2. The method starts at 1298 and at 1288 comprises receiving multiple IP packets at at least one of a SDCC host and a SDIO client. The SDCC host and SDIO client may be the SDCC host and SDIO client described in FIGS. 1-11. At 1278, the method comprises buffering the multiple IP packets at the at least one of a SDCC host and a SDIO client, with the buffering occurring substantially similar as described in reference to FIGS. 1-11. At 1268 the method comprises attaching a multiplexing header to each of the multiple IP packets. The multiplexing header may comprise the header 322 of FIG. 3. At 1258 the method comprises initiating one of a read and a write operation from the SDCC host. Initiating a read command and a write command from the SDCC host are both described above with reference to a downlink transfer of data and an uplink transfer of data, respectively. In one embodiment, a read operation comprising a CMD53 Read operation for an exact number of bytes indicated in a register location may be initiated from the SDCC host. At 1248 the method comprises performing a single multiple block transfer from the one of the SDCC host and SDIO client to the other of the SDCC host and the SDIO client for the multiple IP packets. The single block transfer may comprise a single SDIO transfer. At 1247, the method comprises demultiplexing the multiple IP packets. The method ends at 1208.

FIGS. 9-11 may also comprise a portion of a mobile computing apparatus. For example, the feature comprising a two-state machine described in FIGS. 9-11 may comprise a means for the SDCC host 910, 1010 to control IP packet 912, 1012 aggregation in at least one of the SDIO client 920, 1020 and the SDCC host 910, 1010 through setting the two-state machine to an INACTIVE 929, 1029 state and an ACTIVE 929', 1029' state. As described above, the ACTIVE 929', 1029' state may comprise changing a configurable SDIO client 920, 1020 IP packet 912, 1012 aggregation threshold and a configurable SDCC host 910, 1010 IP packet 912, 1012 aggregation threshold. The ACTIVE 929', 1029' state may also comprise initiating an aggregation timer 944, 1044, while the inactive state may comprise setting an SDIO client IP packet aggregation limit of about 1 byte. The mobile computing apparatus may also comprise means for receiving data at the SDIO client 920, 1020 to transfer to the SDCC host 910, 1010, and means for receiving data at the SDCC host 910, 1010 to transfer to the SDIO client 920, 1020. Furthermore, the mobile computing apparatus may comprise means for generating a host interrupt when data is received at the SDIO client 920, 1010, as described above and means for performing a CMD 53 write operation when a packet is received from a SDCC host application 910, 1010, as described above. The mobile computing apparatus may further comprise means for changing the SDCC host feature to the ACTIVE state.

The mobile computing apparatus may further comprise means for ending the aggregation timer 974, 1074 and means for reading buffered data at the SDIO client 920, 1020, as described with reference to FIGS. 9 and 10. The buffered data may comprise one of a non-zero amount of data and no data. The aggregation timer may be restarted when (i) the buffered data comprises the non-zero amount of data or (ii) an aggregation threshold is reached. Furthermore, the mobile computing apparatus may comprise means for changing the SDCC host feature to the INACTIVE state 929, 1029 when the buffered data comprises no data.

A mobile computing apparatus may also comprise means for initiating an activity timer 1031 as seen in FIG. 10 and means for sending buffered data to the SDIO client 1010 when the SDCC host 1010 aggregation threshold is reached 1064 or the aggregation timer expires 1074. The mobile computing apparatus may also comprise means for ending the activity timer 1032, means for restarting the activity timer when data is received from at least one SDCC host application after the activity timer is initiated, and means for changing the SDCC host feature to the inactive state when no data is received from at least one SDCC host application after the activity timer is initiated.

In conclusion, embodiments of the present invention enable data to be transferred across a SDIO interface more quickly. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A non-transitory, tangible computer readable storage medium, encoded with processor readable instructions to perform a method of transferring SDIO data, the method comprising,
 buffering multiple IP packets to transfer from one of a SDCC host and a SDIO client to the other of the SDCC host and the SDIO client;
 attaching a multiplexing header to each of the multiple IP packets; and
 transferring the multiple IP packets between the one of the SDCC host and the SDIO client to the other of the SDCC host and the SDIO client in a single SDIO transfer.

2. The non-transitory, tangible computer readable storage medium of claim 1 wherein, the multiplexing header comprises,
 a length field; and
 information indicating an end of the attached IP packet.

3. The non-transitory, tangible computer readable storage medium of claim 2 wherein, each multiplexing header further comprises,
 a multiple of an alignment size;
 information indicating a beginning of a subsequent IP packet.

4. The non-transitory, tangible computer readable storage medium of claim 3 wherein, each multiplexing header further comprises a logical channel identifier.

5. The non-transitory, tangible computer readable storage medium of claim 1 further comprising, demultiplexing the multiple IP packets across multiple logical channels.

6. The non-transitory, tangible computer readable storage medium of claim 1 wherein,
 transferring the multiple IP packets comprises transferring the multiple IP packets from the SDIO client to the SDCC host; and further comprising,
 providing a payload size to the SDCC host.

7. The non-transitory, tangible computer readable storage medium of claim 1 wherein,
 at least one of the multiple IP packets comprises an IP packet of about 1500 bytes; and
 transferring the multiple IP packets between the one of a SDCC host and a SDIO client to the other of the SDCC host and the SDIO client in a single SDIO transfer comprises,
 issuing one of at least one SDIO read command and at least one SDIO write command, and
 transferring a portion of the multiple IP packets in a subsequent SDIO transfer.

8. The non-transitory, tangible computer readable storage medium of claim 1 wherein,
 at least one of the multiple IP packets comprises a partial IP packet; and further comprising,
 receiving the partial IP packet;
 processing the partial IP packet;
 re-assembling the partial IP packet; and
 forwarding the multiple IP packets to an application.

9. The non-transitory, tangible computer readable storage medium of claim 1 wherein,
 buffering multiple IP packets to transfer from one of a SDCC host and a SDIO client to the other of the SDCC host and the SDIO client comprises buffering multiple IP packets to transfer from the SDIO client to the SDCC host; and
 the single SDIO transfer comprises issuing a read command.

10. The non-transitory, tangible computer readable storage medium of claim 1 wherein, buffering multiple IP packets to transfer from one of a SDCC host and a SDIO client to the other of the SDCC host and the SDIO client comprises setting a target aggregation threshold.

11. The non-transitory, tangible computer readable storage medium of claim 10 wherein, transferring the multiple IP packets between the one of the SDCC host and the SDIO client to the other of the SDCC host and the SDIO client in a single SDIO transfer occurs upon reaching the target aggregation threshold.

12. The non-transitory, tangible computer readable storage medium of claim 10 further comprising, establishing a configurable target aggregation threshold timer comprising a maximum time to wait in order to reach the target aggregation threshold.

13. The non-transitory, tangible computer readable storage medium of claim 12 further comprising,
   stopping the timer when one of,
      the timer expires, and
      the target aggregation threshold is reached; and
   at least one of,
      scheduling a write operation, and
      issuing a host interrupt.

14. A method of transferring data across an SDIO link comprising,
   receiving multiple IP packets at at least one of a SDCC host and a SDIO client;
   buffering the multiple IP packets at the at least one of a SDCC host and a SDIO client;
   attaching a multiplexing header to each of the multiple IP packets;
   initiating one of a read and a write operation from the SDCC host;
   performing a single multiple block transfer from the one of the SDCC host and SDIO client to the other of the SDCC host and the SDIO client for the multiple IP packets;
   demultiplexing the multiple IP packets.

15. The method of claim 14 wherein,
   the multiple IP packets are received at the SDIO client;
   the multiple IP packets are buffered at the SDIO client;
   a read operation is initiated from the SDCC host, the read operation comprising a CMD53 read for an exact number of bytes indicated in a register location.

16. The method of claim 14 wherein, the multiple IP packets are demultiplexed into different logical channels.

17. A mobile computing apparatus comprising,
   means for a SDCC host to control at least one of a SDIO client IP packet aggregation and a SDCC host IP packet aggregation through configuring a SDCC host feature comprising an active state and an inactive state wherein, the active state comprises,
      at least one of a configurable SDIO client IP packet aggregation threshold and a configurable SDCC host IP packet aggregation threshold, and
      initiating an aggregation timer, and
   the inactive state comprises an SDIO client IP packet aggregation limit of about 1 byte;
   means for setting the SDCC host feature to the inactive state;
   means for at least one of,
      receiving data at the SDIO client to transfer to the SDCC host, and
      receiving data at the SDCC host to transfer to the SDID client;
   means for generating a host interrupt when data is received at the SDIO client;
   means for performing a CMD 53 write operation when a packet is received at the SDCC host; and
   means for changing the SDCC host feature to the active state.

18. The mobile computing apparatus of claim 17 further comprising,
   means for ending the aggregation timer; and
   means for reading buffered data at the SDIO client.

19. The mobile computing apparatus of claim 18 wherein, the buffered data comprises one of a non-zero amount of data and no data; and further comprising,
   means for restarting the aggregation timer when one of the buffered data comprises the non-zero amount of data and the configurable SDIO client IP packet aggregation threshold is reached; and
   means for changing the SDCC host feature to the inactive state when the buffered data comprises no data.

20. The mobile computing apparatus of claim 17 further comprising,
   means for initiating an activity timer; and
   means for sending buffered data to the SDIO client when one of the configurable SDCC host IP packet aggregation threshold is reached and the aggregation timer expires.

21. The mobile computing apparatus of claim 20 further comprising,
   means for ending the activity timer;
   means for restarting the activity timer when data is received from at least one SDCC host application after the activity timer is initiated; and
   means for changing the SDCC host feature to the inactive state when no data is received from at least one SDCC host application after the activity timer is initiated.

* * * * *